(12) United States Patent
Coady et al.

(10) Patent No.: US 12,260,295 B2
(45) Date of Patent: Mar. 25, 2025

(54) CALLBACK-BASED QUBIT MANIPULATION

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

(*) Notice: Subject to any disclaimer, the term of this patent is extended or adjusted under 35 U.S.C. 154(b) by 703 days.

(21) Appl. No.: 17/513,408

(22) Filed: Oct. 28, 2021

(65) Prior Publication Data
US 2023/0139281 A1  May 4, 2023

(51) Int. Cl.
*G06N 10/00* (2022.01)
*G06F 12/02* (2006.01)

(52) U.S. Cl.
CPC ......... *G06N 10/00* (2019.01); *G06F 12/0246* (2013.01)

(58) Field of Classification Search
CPC ............................ G06N 10/00; G06F 12/0246
USPC .......................................................... 716/100
See application file for complete search history.

(56) References Cited

U.S. PATENT DOCUMENTS

| | | | |
|---|---|---|---|
| 10,127,499 | B1 | 11/2018 | Rigetti et al. |
| 10,284,496 | B2 | 5/2019 | Castinado et al. |
| 10,860,759 | B2 | 12/2020 | Roetteler et al. |
| 11,429,512 | B1* | 8/2022 | Naveh .................. G06F 11/3624 |
| 2019/0164076 | A1 | 5/2019 | Kim et al. |
| 2021/0374307 | A1* | 12/2021 | Haener .................. G06N 10/20 |
| 2021/0374594 | A1* | 12/2021 | Langer .................. G06N 10/80 |
| 2021/0406747 | A1* | 12/2021 | Coady .................... G06N 10/80 |
| 2022/0405626 | A1* | 12/2022 | Naveh ................. G06F 16/2455 |
| 2023/0095267 | A1* | 3/2023 | Coady .................... G06N 10/00 |
| | | | 716/100 |
| 2023/0110628 | A1* | 4/2023 | Heckey ................. G06F 9/5038 |

FOREIGN PATENT DOCUMENTS

WO     2020072819 A1    4/2020

OTHER PUBLICATIONS

Kong, W. et al., "Origin Pilot: a Quantum Operating System for Effecient Usage of Quantum Resources," arXiv:2105.10730v1 [quant-ph], May 22, 2021, 12 pages.
Litteken, A. et al., "An updated LLVM-based quantum research compiler with further OpenQASM support," Quantum Science and Technology, vol. 5, May 28, 2020, IOP Publishing Ltd., 20 pages.

* cited by examiner

*Primary Examiner* — Jack Chiang
*Assistant Examiner* — Suchin Parihar
(74) *Attorney, Agent, or Firm* — Dority & Manning, P.A.

(57) ABSTRACT

Enabling callback-based qubit manipulation is disclosed herein. In one example, a quantum computing device comprises a system memory and a processor device communicatively coupled to the system memory. The processor device is to receive a callback request from a requestor, wherein the callback request includes an identifier of a quantum service including a source qubit and an identifier of a callback event. The processor device is further to, responsive to receiving the callback request, allocate a target qubit corresponding to the source qubit of the quantum service and initiate execution of the quantum service. Upon determining that the callback event has occurred as a result of the execution of the quantum service, the processor device is to read an attribute of the source qubit and write the attribute to the target qubit.

20 Claims, 7 Drawing Sheets

CALLBACK-BASED QUBIT MANIPULATION

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently manipulate and propagate data values and quantum states of qubits will be desirable.

SUMMARY

The examples disclosed herein enabling callback-based qubit manipulation. In one example, a callback service, executing on a quantum computing device, provides a mechanism by which an attribute (a data value or a quantum state, as non-limiting examples) of a source qubit of a quantum service is transferred to a target qubit as a result of an occurrence of a callback event (such as a result of the execution of the quantum service becoming available, an upcoming deallocation of the source qubit, a termination of the quantum service, or a change in a state of the quantum service).

In another example, a method for enabling callback-based qubit manipulation is disclosed. The method comprises receiving, by a quantum computing device, a callback request from a requestor, wherein the callback request comprises an identifier of a quantum service comprising a source qubit and an identifier of a callback event. The method further comprises, responsive to receiving the callback request, allocating a target qubit corresponding to the source qubit of the quantum service. The method also comprises initiating execution of the quantum service. The method additionally comprises determining that the callback event has occurred as a result of the execution of the quantum service. The method further comprises, responsive to determining that the callback event has occurred, reading an attribute of the source qubit, and writing the attribute to the target qubit.

In another example, a quantum computing device for enabling callback-based qubit manipulation is disclosed. The quantum computing device comprises a system memory and a processor device communicatively coupled to the system memory. The processor device is to receive a callback request from a requestor, wherein the callback request comprises an identifier of a quantum service comprising a source qubit and an identifier of a callback event. The processor device is further to, responsive to receiving the callback request, allocate a target qubit corresponding to the source qubit of the quantum service. The processor device is also to initiate execution of the quantum service. The processor device is additionally to determine that the callback event has occurred as a result of the execution of the quantum service. The processor device is further to, responsive to determining that the callback event has occurred, read an attribute of the source qubit, and write the attribute to the target qubit.

In another example, a non-transitory computer-readable medium is disclosed. The non-transitory computer-readable medium stores thereon computer-executable instructions that, when executed, cause one or more processor devices to receive a callback request from a requestor, wherein the callback request comprises an identifier of a quantum service comprising a source qubit and an identifier of a callback event. The computer-executable instructions further cause the one or more processor devices to, responsive to receiving the callback request, allocate a target qubit corresponding to the source qubit of the quantum service. The computer-executable instructions also cause the one or more processor devices to initiate execution of the quantum service. The computer-executable instructions additionally cause the one or more processor devices to determine that the callback event has occurred as a result of the execution of the quantum service. The computer-executable instructions further cause the one or more processor devices to, responsive to determining that the callback event has occurred, read an attribute of the source qubit, and write the attribute to the target qubit.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first qubit" and "second qubit," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently manipulate and configure qubits will be desirable. In particular, it may be desirable to provide functionality for retrieving and storing a qubit's data value or quantum state resulting from, e.g., execution of a quantum service, for storage or further use by another quantum service.

In this regard, the examples disclosed herein implement a callback service for enabling callback-based qubit manipulation. In conventional classical computer programs, callback mechanisms enable a function or other executable code to be invoked as a result of another function completing execution synchronously or asynchronously. The callback service according to examples disclosed herein provides analogous functionality for qubit manipulation by transferring an attribute of a source qubit (a data value or a quantum state, as non-limiting examples) to a target qubit as a result of an occurrence of a callback event. The callback event may be, for example, a result of the execution of a quantum service becoming available, an upcoming deallocation of the source qubit, a termination of the quantum service, or a change in a state of the quantum service, as non-limiting examples.

In exemplary operation, the callback service, executing on a quantum computing device, receives a callback request from a requestor (e.g., a service or process executing on the quantum computing device or on another computing device). The callback request includes an identifier of a quantum service that employs a source qubit, and further includes an identifier of a callback event, the occurrence of which will cause the callback service to transfer the attribute of the source qubit to the target qubit. The source qubit in some examples may be identified by the callback service based on the identifier of the quantum service (e.g., by accessing functionality provided by a qubit registry of the quantum computing device). Some examples may further provide that the callback request includes an identifier of the target qubit and/or an identifier of the attribute of the source qubit that will be transferred to the target qubit.

Upon receiving the callback request, the callback service allocates the target qubit corresponding to the source qubit. The callback service then initiates execution of the quantum service (e.g., by accessing functionality provided by a quantum task manager and/or a quantum service scheduler of the quantum computing device based on the identifier of the quantum service). When the callback service determines that the callback event has occurred as a result of the execution of the quantum service (based on the identifier of the callback event), the callback service reads the attribute of the source qubit, and writes the attribute to the target qubit. For instance, in examples in which the attribute comprises a data value of the source qubit, the callback service may read the data value stored by the source qubit, and then write the data value to the target qubit. Similarly, in examples in which the attribute comprises a quantum state of the source qubit (e.g., a spin state, as a non-limiting examples), the callback service may determine the quantum state of the source qubit, and then place the target qubit in the quantum state of the source qubit.

In some examples, the callback service may write an indication of the attribute of the source qubit to a data store of a classical computing device. In this manner, the classical computing device may back up the attribute of the source qubit, and/or may perform further classical computing operations based on the attribute of the source qubit.

Figure 1:
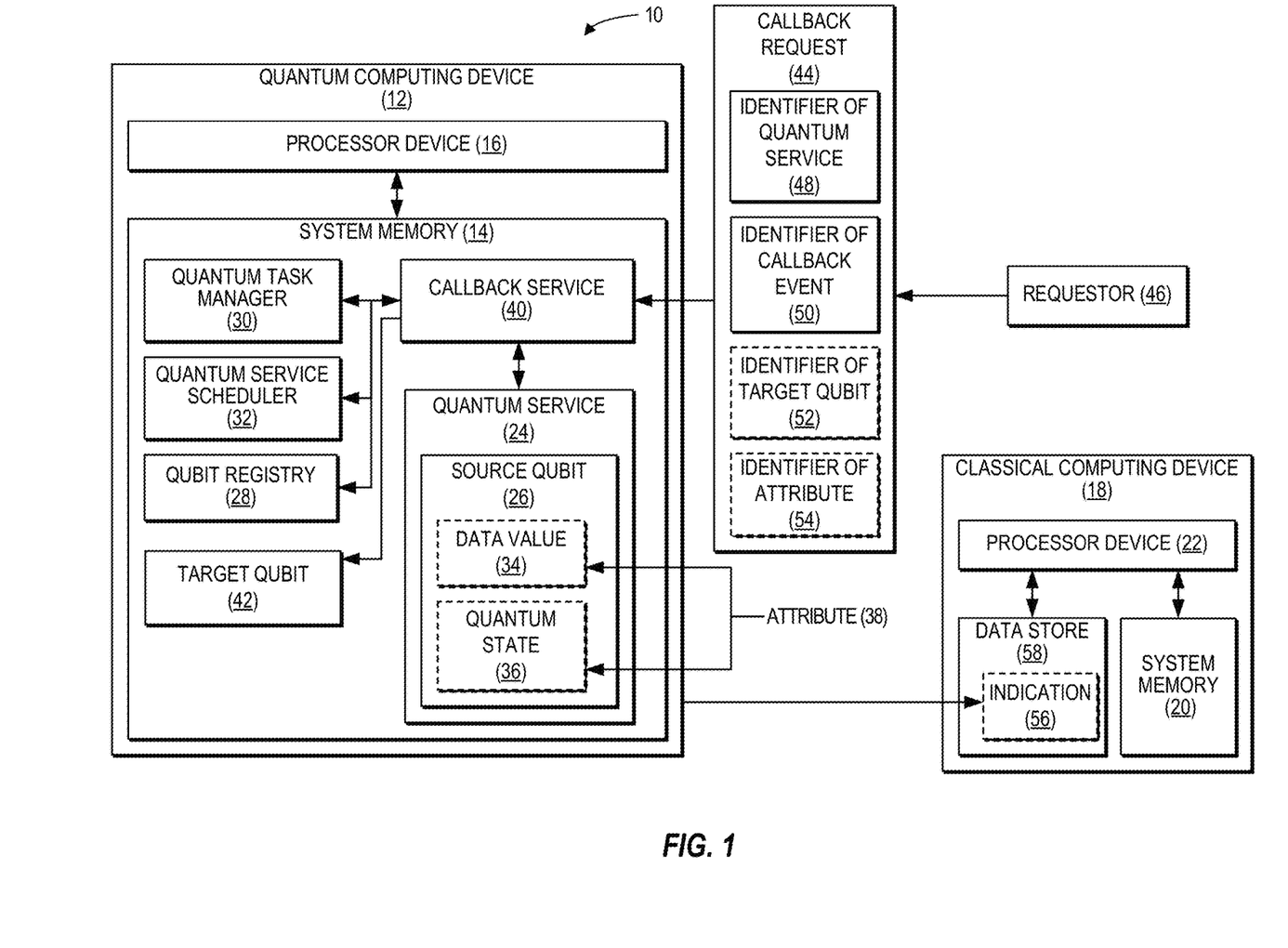
FIG. 1 is a block diagram of a computing system in which examples may be practiced.

FIG. 1 is a block diagram of a computing system 10 according to one example. The computing system 10 includes a quantum computing device 12 that comprises a system memory 14 and a processor device 16, and further includes a classical computing device 18 that comprises a system memory 20 and a processor device 22. The quantum computing device 12 and the classical computing device 18 in the example of FIG. 1 are all communicatively coupled via a classical communications link (not shown), which may comprise a private network or a public network such as the internet. The quantum computing device 12 may also be communicatively coupled to other quantum computing devices (not shown) via a quantum channel (not shown) over which qubits may be transmitted. It is to be understood that the computing system 10, according to some examples, may include more or fewer quantum computing devices and/or classical computing devices than illustrated in FIG. 1. Additionally, the quantum computing device 12 and/or the classical computing device 18 in some examples may include constituent elements in addition to those illustrated in FIG. 1.

The quantum computing device 12 in the example of FIG. 1 operates in quantum environments, but is capable of operating using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In the example of FIG. 1, the quantum computing device 12 executes a quantum service 24, which comprises a process that employs one or more qubits such as a qubit 26 (also referred to herein as the "source qubit 26") to perform quantum operations. To maintain information for qubits such as the source qubit 26, the quantum computing device 12 may include a qubit registry 28, which comprises a plurality of qubit registry entries that each correspond to a qubit. The qubit registry 28 maintains and provides access to data relating to the qubits implemented by the quantum computing device 12, including a count of the total number of qubits implemented by the quantum computing device 12 and a count of the number of available qubits that are currently available for allocation, as non-limiting examples. Each of the qubit registry entries of the qubit registry 28 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the quantum service 24 is facilitated by a quantum task manager 30 and a quantum service scheduler 32, each of which operates in a manner analogous to their conventional classical counterparts. Thus, the quantum task manager 30 of the quantum computing device 12 handles operations for creating, monitoring, and terminating quantum services, while the quantum service scheduler 32 of the quantum computing device 12 controls the scheduling of quantum services for execution by the processor device 16, and the allocation of processing resources to executing quantum services. The functionality of the quantum task manager 30 and the quantum service scheduler 32 may be made accessible to other services and processes (e.g., via a defined application programming interface (API), as a non-limiting example).

The source qubit 26 of the quantum service 24 may be used to store a data value 34, and/or may have a quantum state 36 (e.g., spin, as a non-limiting example) into which the source qubit 26 is programmatically placed. The data value 34 and the quantum state 36 each are generally referred to herein as an attribute 38 of the source qubit 26. In some use cases, it may be desirable to provide functionality for retrieving and storing the attribute 38 of the source qubit 26 for later access or further use by another quantum service (not shown) or the classical computing device 18.

In this regard, the quantum computing device 12 of FIG. 1 implements a callback service 40 providing callback-based qubit manipulation functionality. The callback service 40 in the example of FIG. 1 is communicatively coupled to the quantum task manager 30, the quantum service scheduler 32, and the qubit registry 28. Accordingly, the callback service 40 may access data related to qubit allocation and deallocation, qubit state, the use of qubits by executing quantum services, and the current and upcoming state of executing quantum services, as non-limiting examples. The callback service 40 may include a table or other appropriate data structure (not shown) for tracking and mapping quantum services, qubits, and/or callback events to provide the functionality described herein.

The callback service provides functionality for qubit manipulation that is analogous to conventional callback mechanisms, by transferring the attribute 38 of the source qubit 26 (i.e., the data value 34 or the quantum state 36) to a target qubit 42 as a result of an occurrence of a callback event. The callback event may be, for example, a result of the execution of the quantum service 24 becoming available, an upcoming deallocation of the source qubit 26, a termination of the quantum service 24, or a change in a state of the quantum service 24, as non-limiting examples.

In exemplary operation, the callback service 40 receives a callback request 44 from a requestor 46, which may comprise a service or process executing on the quantum computing device 12 or on another computing device. The callback request 44 includes an identifier 48 of the quantum service 24 that employs the source qubit 26, and also includes an identifier 50 of a callback event. Some examples may provide that the source qubit 26 may be identified by the callback service 40 based on the identifier 48 of the quantum service 24, which may be accomplished by accessing functionality provided by the qubit registry 28 of the quantum computing device 12. Some examples may further provide that the callback request 44 includes an identifier 52 of the target qubit 42 and/or an identifier 54 of the attribute 38 of the source qubit 26 that will be transferred to the target qubit 42 upon an occurrence of the callback event.

Upon receiving the callback request 44, the callback service 40 allocates the target qubit 42 corresponding to the source qubit 26 (e.g., by accessing functionality provided by the qubit registry 28 of the quantum computing device 12). The callback service 40 then initiates execution of the quantum service 24 by, for example, accessing functionality provided by the quantum task manager 30 and/or the quantum service scheduler 32 of the quantum computing device 12. When the callback service 40 determines that the callback event has occurred as a result of the execution of the quantum service 24, the callback service 40 reads the attribute 38 of the source qubit 26, and writes the attribute 38 to the target qubit 42. Thus, in examples in which the attribute 38 comprises the data value 34 of the source qubit 26, the callback service 40 may read the data value 34 stored by the source qubit 26, and then write the data value 34 to the target qubit 42. In examples in which the attribute 38 comprises the quantum state 36 of the source qubit 26, the callback service 40 may determine the quantum state 36 of the source qubit 26, and then place the target qubit 42 in the quantum state 36 of the source qubit 26.

In some examples, the callback service 40 may also write an indication 56 of the attribute 38 of the source qubit 26 to a data store 58 of the classical computing device 18. The data store 58 may comprise any persistent storage device or media, such as a hard disk drive (HDD) or flash memory. The indication 56 may comprise a classical representation, in text or binary code, of the attribute 38 (i.e., the data value 34 and/or the quantum state 36, in the example of FIG. 1) of the source qubit 26. In this manner, the classical computing device 18 may back up the attribute 38 of the source qubit 26, and/or may perform further classical computing operations based on the attribute 38 of the source qubit 26.

It is to be understood that, because the callback service 40 is a component of the quantum computing device 12, functionality implemented by the callback service 40 may be attributed to the computing system 10 generally. Moreover, in examples where the callback service 40 comprises software instructions that program the processor device 16 to carry out functionality discussed herein, functionality implemented by the callback service 40 may be attributed herein to the processor device 16. It is to be further understood that while, for purposes of illustration only, the callback service 40 is depicted as a single component, the functionality implemented by the callback service 40 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
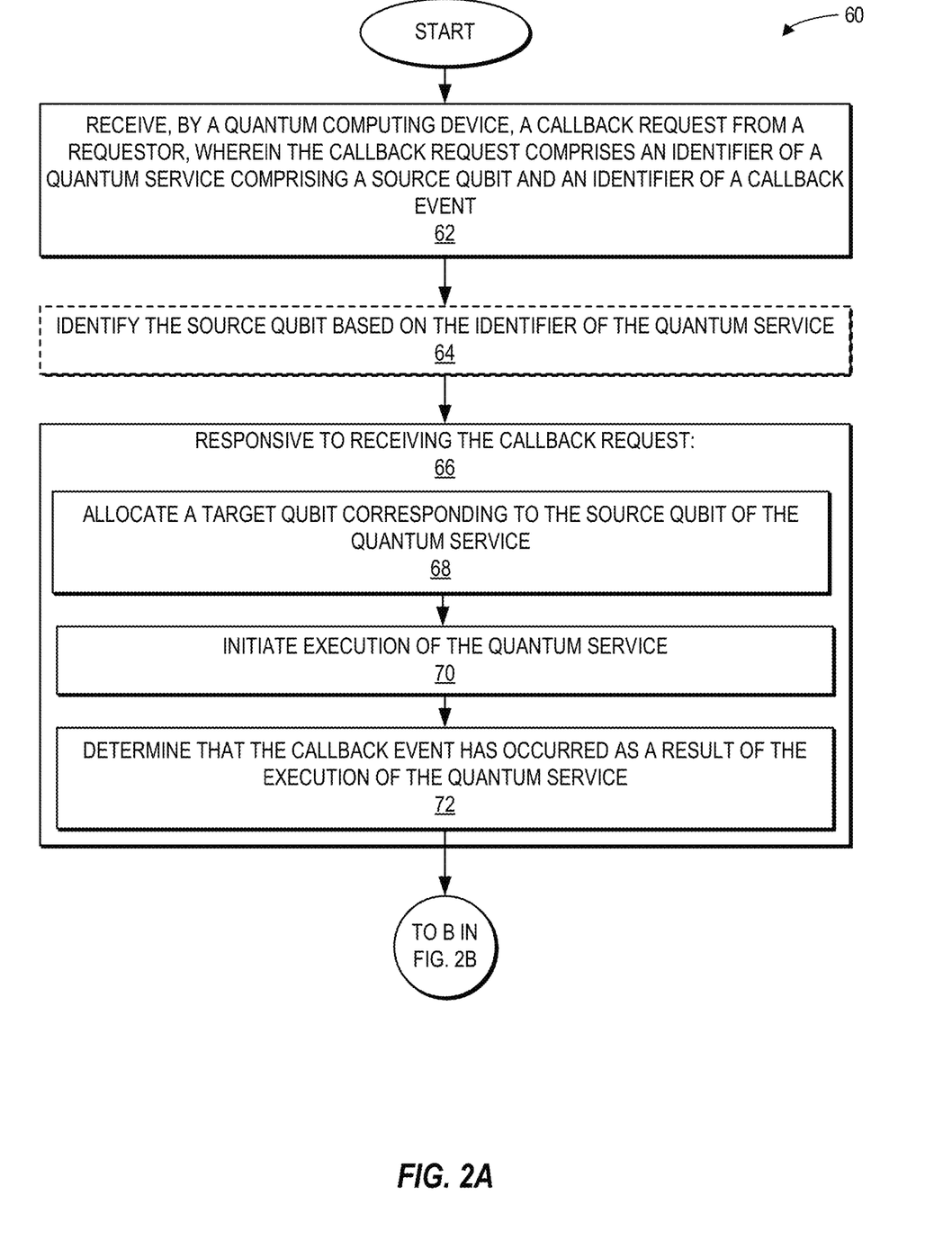
FIGS. 2A-2B are flowcharts illustrating operations performed by the computing system of FIG. 1 for enabling callback-based qubit manipulation, according to one example.
Figure 2B:
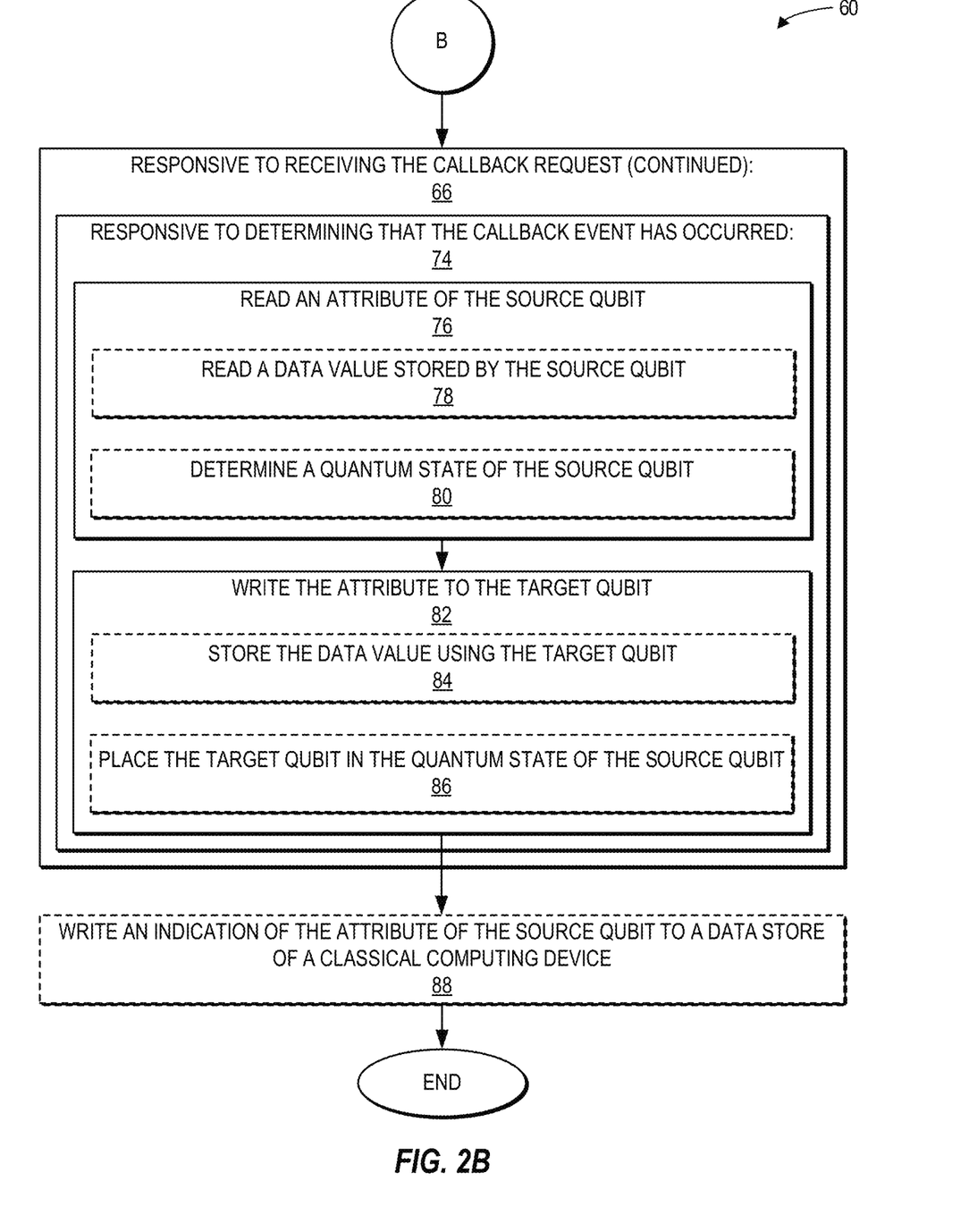

To illustrate exemplary operations performed by the computing system 10 of FIG. 1 for enabling callback-based qubit manipulation according to one example, FIGS. 2A and 2B provide a flowchart 60. Elements of FIG. 1 are referenced in describing FIGS. 2A and 2B for the sake of clarity. In FIG. 2A, operations begin with the processor device 16 of the quantum computing device 12 (e.g., by executing the callback service 40 of FIG. 1) receiving a callback request (such as the callback request 44 of FIG. 1) from a requestor (e.g., the requestor 46 of FIG. 1), wherein the callback request 44 comprises an identifier of a quantum service comprising a source qubit (such as the identifier 48 of the quantum service 24 comprising the source qubit 26 of FIG. 1) and an identifier of a callback event (e.g., the identifier 50 of the callback event of FIG. 1) (block 62). In some examples, the processor device 16 may identify the source qubit 26 based on the identifier of the quantum service 24 (block 64).

Responsive to receiving the callback request 44, the processor device 16 performs a series of operations (block 66). The processor device 16 allocates a target qubit, such as the target qubit 42 of FIG. 1, corresponding to the source qubit 26 of the quantum service 24 (block 68). The processor device 16 then initiates execution of the quantum service 24 (block 70). This may be accomplished in some examples by accessing functionality provided by the quantum task manager 30 and/or the quantum service scheduler 32. The processor device 16 then determines that the callback event has occurred as a result of the execution of the quantum service 24 (block 72). Operations then continue at block 74 of FIG. 2B.

Referring now to FIG. 2B, the operations performed by the processor device 16 in response to receiving the callback request 44 continue (block 66). The processor device 16 performs a series of operations responsive to determining that the callback event has occurred (block 74). The processor device 16 first reads an attribute, such as the attribute 38 of FIG. 1, of the source qubit 26 (block 76). In some examples, the operations of block 76 for reading the attribute 38 may comprise reading a data value stored by the source qubit 26, such as the data value 34 of FIG. 1 (block 78). Some examples may provide that the operations of block 76 for reading the attribute 38 may comprise determining a quantum state of the source qubit 26, such as the quantum state 36 of FIG. 1 (block 80).

The processor device 16 next writes the attribute 38 to the target qubit 42 (block 82). According to some examples, the operations of block 82 for writing the attribute 38 may comprise storing the data value 34 using the target qubit 42 (block 84). In some examples, the operations of block 82 for writing the attribute 38 may comprise setting a quantum state (e.g., the quantum state 36 of FIG. 1) of the target qubit 42 in the quantum state 36 of the source qubit (block 86). Some examples may further provide that the processor device 16 may write an indication (such as the indication 56 of FIG. 1) of the attribute 38 of the source qubit 26 to a data store (e.g., the data store 58 of FIG. 1) of a classical computing device (such as the classical computing device 18 of FIG. 1) (block 88).

Figure 3:
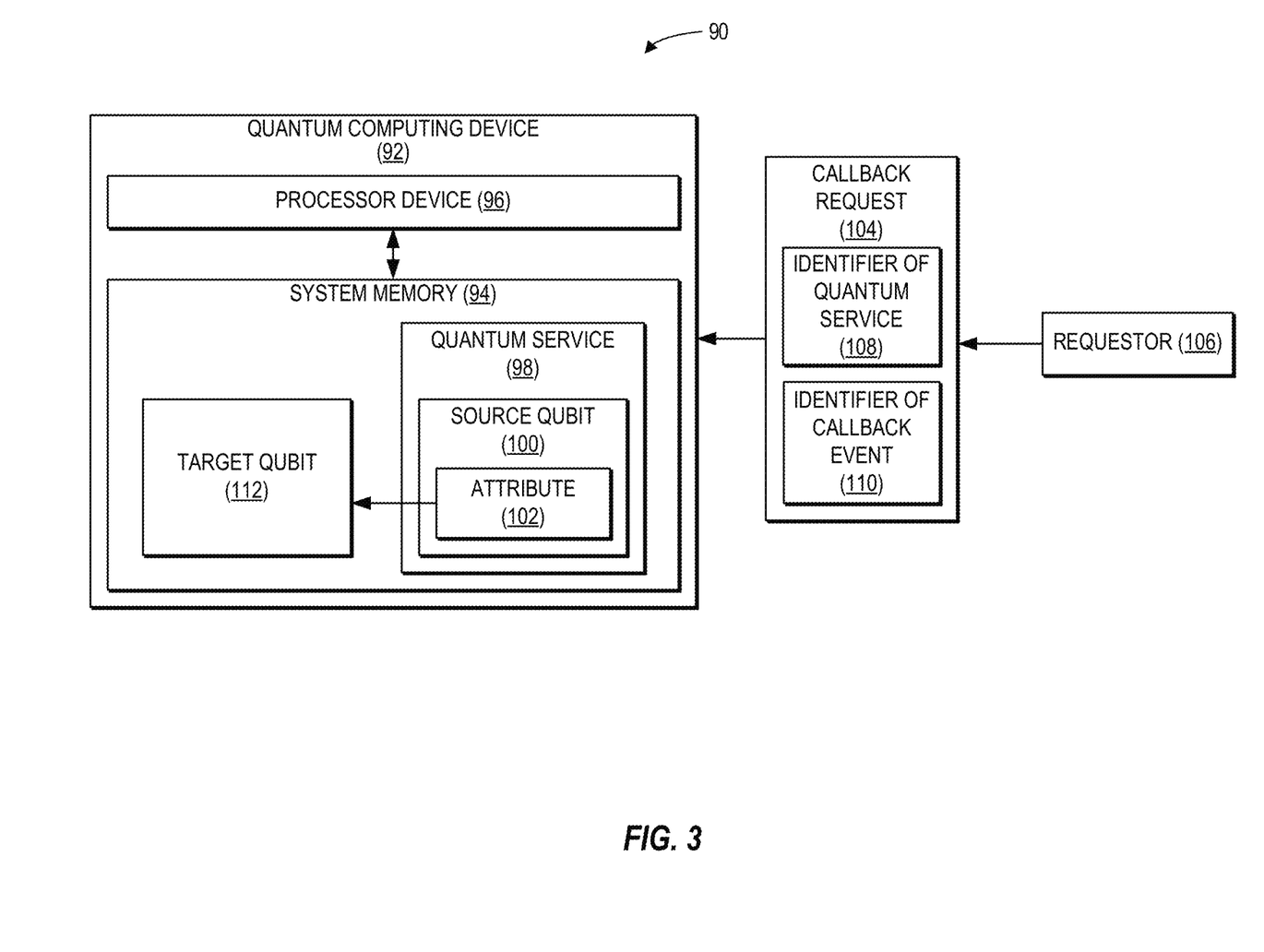
FIG. 3 is a simpler block diagram of the computing system of FIG. 1 for enabling callback-based qubit manipulation, according to one example.

FIG. 3 is a simpler block diagram of the computing system 10 of FIG. 1 for enabling callback-based qubit manipulation, according to one example. In the example of FIG. 3, a computing system 90 includes a quantum computing device 92 that comprises a system memory 94 and a processor device 96. The quantum computing device 92 executes a quantum service 98, which comprises a source qubit 100 having an attribute 102.

In exemplary operation, the processor device 96 receives a callback request 104 from a requestor 106. The callback request 104 includes an identifier 108 of the quantum service 98 that employs the source qubit 100, and also includes an identifier 110 of a callback event. In response to receiving the callback request 104, the processor device 96 allocates a target qubit 112 corresponding to the source qubit 100, and initiates execution of the quantum service 98. When the processor device 96 determines that the callback event has occurred as a result of the execution of the quantum service 98, the processor device 96 reads the attribute 102 of the source qubit 100, and writes the attribute 102 to the target qubit 112.

Figure 4:
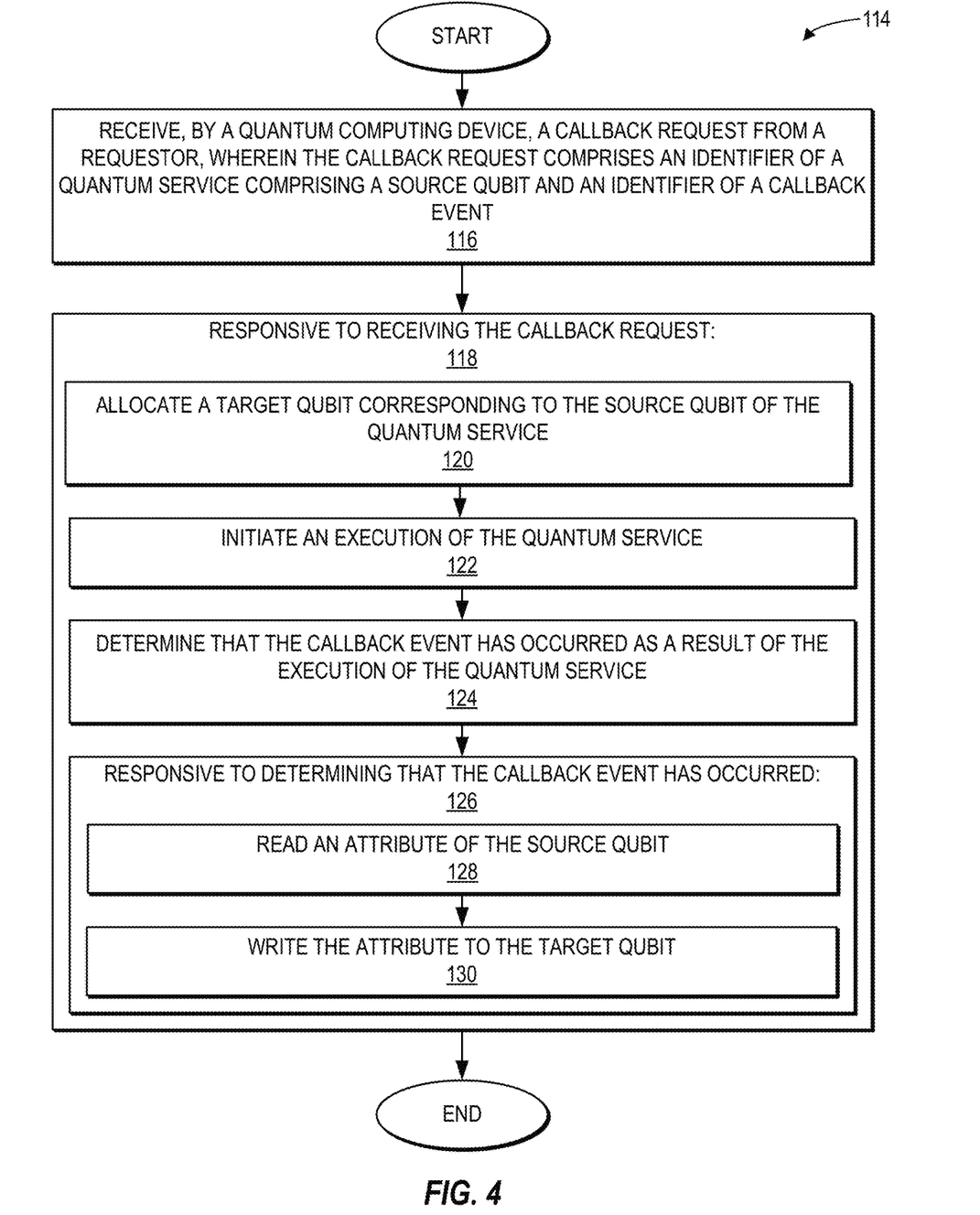
FIG. 4 is a flowchart of a simplified method for enabling callback-based qubit manipulation by the quantum computing device of FIG. 3, according to one example.

FIG. 4 provides a flowchart 114 of a simplified method for enabling callback-based qubit manipulation by the quantum computing device 92 of FIG. 3, according to one example. For the sake of clarity, elements of FIG. 3 are referenced in describing FIG. 4. Operations in FIG. 4 begin with the processor device 96 of the quantum computing device 92 receiving the callback request 104 from the requestor 106, wherein the callback request 104 comprises an identifier 108 of a quantum service 98 comprising a source qubit 100 and an identifier 110 of a callback event (block 116). The processor device 96 then performs a series of operations responsive to receiving the callback request 104 (block 118). The processor device 96 allocates the target qubit 112 corresponding to the source qubit 100 of the quantum service 98 (block 120). The processor device 96 next initiates execution of the quantum service 98 (block 122). The processor device 96 then determines that the callback event has occurred as a result of the execution of the quantum service 98 (block 124).

The processor device 96 performs a series of operations responsive to determining that the callback event has occurred (block 126). The processor device 96 first reads an attribute 102 of the source qubit 100 (block 128). The processor device 96 then writes the attribute 102 to the target qubit 112 (block 130).

Figure 5:
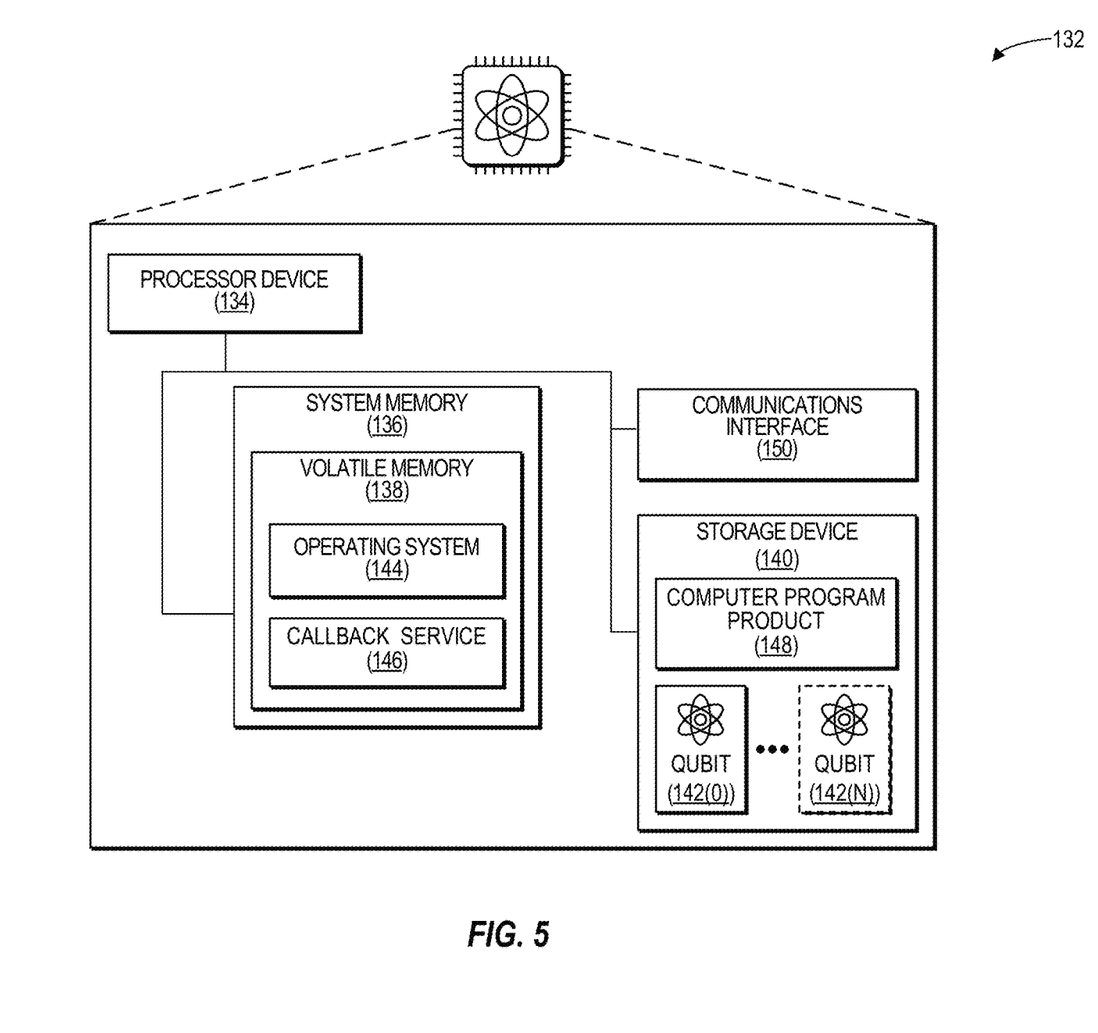
FIG. 5 is a block diagram of a quantum computing device suitable for implementing examples, according to one example.

FIG. 5 is a block diagram of a quantum computing device 132, such as the quantum computing device 12 of FIG. 1, suitable for implementing examples according to one example. The quantum computing device 132 may comprise any suitable quantum computing device or devices. The quantum computing device 132 can operate using classical computing principles or quantum computing principles. When using quantum computing principles, the quantum computing device 132 performs computations that utilize quantum-mechanical phenomena, such as superposition and entanglement. The quantum computing device 132 may operate under certain environmental conditions, such as at or near zero degrees (0°) Kelvin. When using classical computing principles, the quantum computing device 132 utilizes binary digits that have a value of either zero (0) or one (1).

The quantum computing device 132 includes a processor device 134 and a system memory 136. The processor device 134 can be any commercially available or proprietary processor suitable for operating in a quantum environment. The system memory 136 may include volatile memory 138 (e.g., random-access memory (RAM)). The quantum computing device 132 may further include or be coupled to a non-transitory computer-readable medium such as a storage device 140. The storage device 140 and other drives associated with computer-readable media and computer-usable media may provide non-volatile storage of data, data structures, computer-executable instructions, and the like. The storage device may also provide functionality for storing one or more qubits 142(0)-142(N).

A number of modules can be stored in the storage device 140 and in the volatile memory 138, including an operating system 144 and one or more modules, such as a callback service 146. All or a portion of the examples may be implemented as a computer program product 148 stored on a transitory or non-transitory computer-usable or computer-readable medium, such as the storage device 140, which includes complex programming instructions, such as complex computer-readable program code, to cause the processor device 134 to carry out the steps described herein. Thus, the computer-readable program code can comprise computer-executable instructions for implementing the functionality of the examples described herein when executed on the processor device 134.

An operator may also be able to enter one or more configuration commands through a keyboard (not illustrated), a pointing device such as a mouse (not illustrated), or a touch-sensitive surface such as a display device (not illustrated). The quantum computing device 132 may also include a communications interface 150 suitable for communicating with other quantum computing systems, including, in some implementations, classical computing devices.

Figure 6:
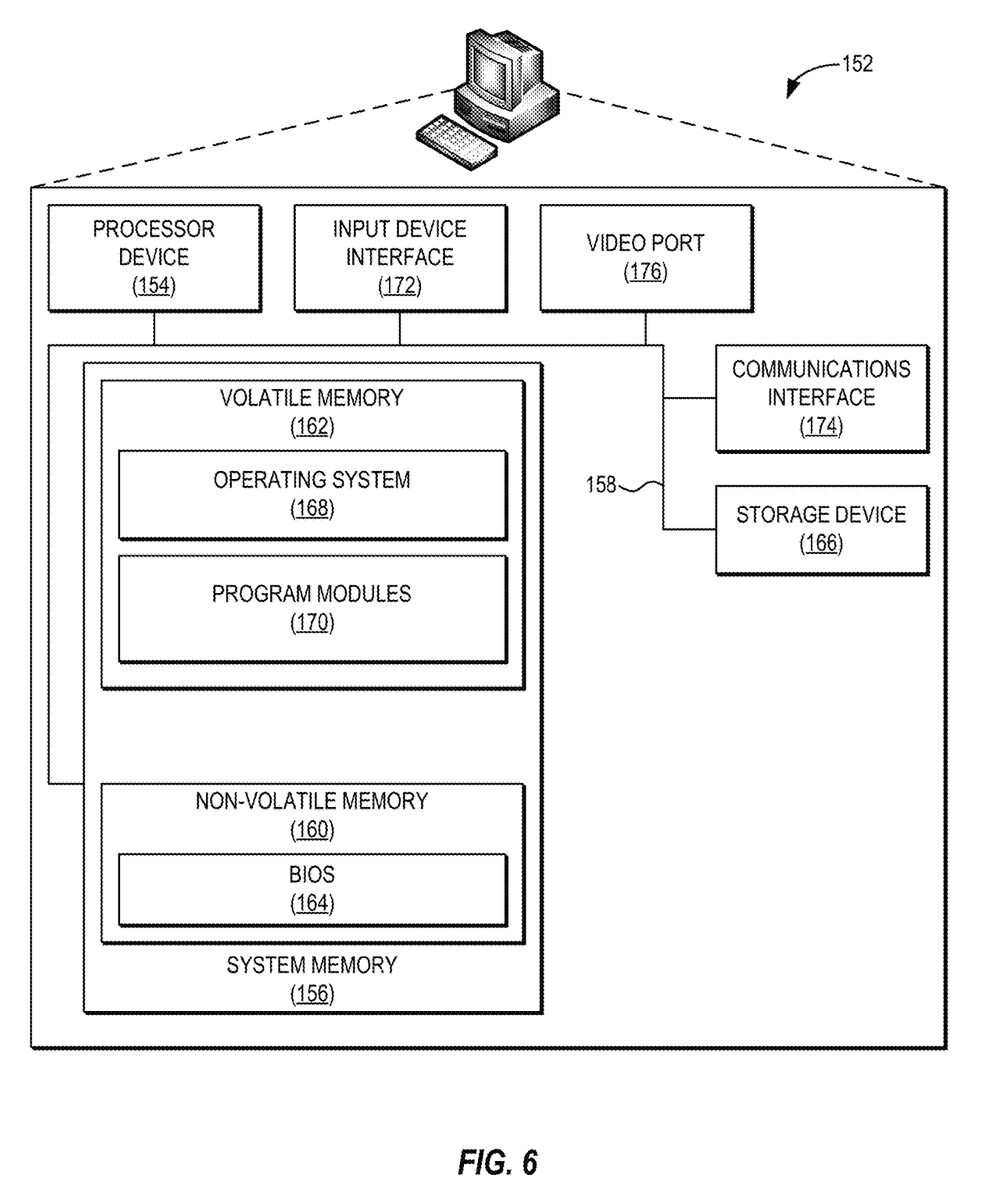
FIG. 6 is a block diagram of a classical computing device suitable for implementing examples, according to one example.

FIG. 6 is a block diagram of a processor-based computing device 152 ("computing device 152" or "classical computing device 152"), such as the classical computing device 18 of FIG. 1, suitable for implementing examples according to one example. The computing device 152 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 152 includes a processor device 154, a system memory 156, and a system bus 158. The system bus 158 provides an interface for system components including, but not limited to, the system memory 156 and the processor device 154. The processor device 154 can be any commercially available or proprietary processor.

The system bus 158 may be any of several types of bus structures that may further interconnect to a memory bus (with or without a memory controller), a peripheral bus, and/or a local bus using any of a variety of commercially available bus architectures. The system memory 156 may include non-volatile memory 160 (e.g., read-only memory (ROM), erasable programmable ROM (EPROM), electrically EPROM (EEPROM), etc.), and volatile memory 162 (e.g., RAM). A basic input/output system (BIOS) 164 may be stored in the non-volatile memory 160 and can include the basic routines that help to transfer information among elements within the computing device 152. The volatile memory 162 may also include a high-speed RAM, such as static RAM, for caching data.

The computing device 152 may further include or be coupled to a non-transitory computer-readable storage medium such as a storage device 166, which may comprise, for example, an internal or external hard disk drive (HDD) (e.g., enhanced integrated drive electronics (EIDE) or serial advanced technology attachment (SATA)), for storage, flash memory, or the like. The storage device 166 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 166 and in the volatile memory 162, including an operating system 168 and one or more program modules 170 which may implement the functionality described herein in whole or in part. It is to be appreciated that the examples can be implemented with various commercially available operating systems 168 or combinations of operating systems 168. All or a portion of the examples may be implemented as a computer program product stored on a transitory or non-transitory computer-usable or computer-readable storage medium, such as the storage device 166, which includes complex programming instructions, such as complex computer-readable program code, to cause the processor device 154 to carry out the steps described herein. Thus, the computer-readable program code can comprise software instructions for implementing the functionality of the examples described herein when executed on the processor device 154. The processor device 154 may serve as a controller, or control system, for the computing device 152 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 154 through an input device interface 172 that is coupled to the system bus 158 but can be connected by other interfaces, such as a parallel port, an Institute of Electrical and Electronic Engineers (IEEE) 1394 serial port, a Universal Serial Bus (USB) port, an IR interface, and the like.

The computing device 152 may also include a communications interface 174 suitable for communicating with a network as appropriate or desired. The computing device 152 may also include a video port 176 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
receiving, by a quantum computing device, a callback request from a requestor, wherein the callback request comprises an identifier of a quantum service comprising a source qubit and an identifier of a callback event;
responsive to receiving the callback request:
allocating a target qubit corresponding to the source qubit of the quantum service;
initiating execution of the quantum service;
determining that the callback event has occurred as a result of the execution of the quantum service; and
responsive to determining that the callback event has occurred:
reading an attribute of the source qubit; and
writing the attribute to the target qubit.

2. The method of claim 1, further comprising identifying the source qubit based on the identifier of the quantum service.

3. The method of claim 1, wherein the callback event comprises a result of the execution of the quantum service becoming available, an upcoming deallocation of the source qubit, a termination of the quantum service, and a change in a state of the quantum service.

4. The method of claim 1, wherein the callback request further comprises one or more of an identifier of the target qubit and an identifier of the attribute of the source qubit.

5. The method of claim 1, further comprising writing an indication of the attribute of the source qubit to a data store of a classical computing device.

6. The method of claim 1, wherein:
reading the attribute comprises reading a data value stored by the source qubit; and
writing the attribute comprises storing the data value using the target qubit.

7. The method of claim 1, wherein:
reading the attribute comprises determining a quantum state of the source qubit; and
writing the attribute comprises placing the target qubit in the quantum state of the source qubit.

8. A quantum computing device, comprising:
a system memory; and
a processor device communicatively coupled to the system memory, the processor device to:
receive a callback request from a requestor, wherein the callback request comprises an identifier of a quantum service comprising a source qubit and an identifier of a callback event; and
responsive to receiving the callback request:
allocate a target qubit corresponding to the source qubit of the quantum service;
initiate execution of the quantum service;
determine that the callback event has occurred as a result of the execution of the quantum service; and
responsive to determining that the callback event has occurred:
read an attribute of the source qubit; and
write the attribute to the target qubit.

9. The quantum computing device of claim 8, wherein the processor device is further to identify the source qubit based on the identifier of the quantum service.

10. The quantum computing device of claim 8, wherein the callback event comprises a result of the execution of the quantum service becoming available, an upcoming deallocation of the source qubit, a termination of the quantum service, and a change in a state of the quantum service.

11. The quantum computing device of claim 8, wherein the callback request further comprises one or more of an identifier of the target qubit and an identifier of the attribute of the source qubit.

12. The quantum computing device of claim 8, wherein the processor device is further to write an indication of the attribute of the source qubit to a data store of a classical computing device.

13. The quantum computing device of claim 8, wherein:
to read the attribute is to read a data value stored by the source qubit; and
to write the attribute is to store the data value using the target qubit.

14. The quantum computing device of claim 8, wherein:
to read the attribute is to determine a quantum state of the source qubit; and
to write the attribute is to place the target qubit in the quantum state of the source qubit.

15. A non-transitory computer-readable medium having stored thereon computer-executable instructions that, when executed, cause one or more processor devices to:
receive a callback request from a requestor, wherein the callback request comprises an identifier of a quantum service comprising a source qubit and an identifier of a callback event; and
responsive to receiving the callback request:
allocate a target qubit corresponding to the source qubit of the quantum service;
initiate execution of the quantum service;
determine that the callback event has occurred as a result of the execution of the quantum service; and
responsive to determining that the callback event has occurred:
read an attribute of the source qubit; and
write the attribute to the target qubit.

16. The non-transitory computer-readable medium of claim 15, wherein the computer-executable instructions further cause the one or more processors to identify the source qubit based on the identifier of the quantum service.

17. The non-transitory computer-readable medium of claim 15, wherein the callback event comprises a result of the execution of the quantum service becoming available, an upcoming deallocation of the source qubit, a termination of the quantum service, and a change in a state of the quantum service.

18. The non-transitory computer-readable medium of claim 15, wherein the computer-executable instructions further cause the one or more processors to write an indication of the attribute of the source qubit to a data store of a classical computing device.

19. The non-transitory computer-readable medium of claim 15, wherein:
to read the attribute is to read a data value stored by the source qubit; and
to write the attribute is to store the data value using the target qubit.

20. The non-transitory computer-readable medium of claim 15, wherein:
to read the attribute is to determine a quantum state of the source qubit; and
to write the attribute is to place the target qubit in the quantum state of the source qubit.

* * * * *